(12) United States Patent
Koch et al.

(10) Patent No.: US 6,228,275 B1
(45) Date of Patent: May 8, 2001

(54) METHOD OF MANUFACTURING A SENSOR

(75) Inventors: Daniel J. Koch, Mesa; Jonathan H. Hammond, Scottsdale; Daniel N. Koury, Jr., Mesa; Jonathan F. Gorrell, Phoenix, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/208,924

(22) Filed: Dec. 10, 1998

(51) Int. Cl.⁷ .................................................. H01L 21/302
(52) U.S. Cl. ..................... 216/2; 438/50; 438/52
(58) Field of Search .................. 216/2; 438/50, 438/52, 53

(56) References Cited

U.S. PATENT DOCUMENTS

| | | | |
|---|---|---|---|
| 4,882,933 | 11/1989 | Petersen et al. | 73/517 R |
| 5,181,156 | 1/1993 | Gutteridge et al. | 361/283 |
| 5,542,295 | 8/1996 | Howe et al. | 73/514.18 |
| 5,750,420 | 5/1998 | Bono | 438/52 |
| 5,846,849 | 12/1998 | Shaw et al. | 438/52 |
| 5,879,963 | 3/1999 | Howe et al. | 438/52 |
| 6,028,332 | 2/2000 | Kano et al. | 257/254 |
| 6,065,341 | 5/2000 | Ishio et al. | 73/514.32 |
| 6,074,890 | 6/2000 | Yao et al. | 438/52 |

FOREIGN PATENT DOCUMENTS 8-43436 * 2/1996 (JP).

* cited by examiner

*Primary Examiner*—Anita Alanko
(74) *Attorney, Agent, or Firm*—A. Kate Huffman

(57) ABSTRACT

A sensor has a support substrate (200), an electrode (110, 510, 710) movable relative to a surface (201) of the support substrate (200) and comprised of a first material, a structure (160, 460, 560, 760) over a portion of the electrode (110, 510, 710) to limit mobility of the electrode (110, 510, 710) and comprised of a second material different from the first material, and bonding pads (170, 470) outside a perimeter of the electrode (110, 510, 710) and comprised of the second material.

17 Claims, 3 Drawing Sheets

METHOD OF MANUFACTURING A SENSOR

BACKGROUND OF THE INVENTION

This invention relates, in general, to electronics, and more particularly, to sensors and methods of manufacture.

Micromachined sensors can detect acceleration by measuring a change in capacitance. Many sensors are in-plane sensors that detect acceleration along an axis parallel to the surface of a support substrate. These in-plane sensors have an electrode that overlies the surface of the support substrate where the electrode moves along the axis in response to an acceleration along that same axis. The electrode moves between two stationary electrodes, and the differential capacitance between the two stationary electrodes and the movable electrode can be used to determine the magnitude of acceleration.

However, these in-plane sensors are also mobile along an orthogonal axis that is perpendicular to the surface of the underlying support substrate. A large acceleration force along that orthogonal axis could move the movable electrode on top of one of the two stationary electrodes, and the movable electrode could remain immobilized in that position. This immobilization renders the sensor inoperable.

Accordingly, a need exists for an improved sensor and method of use that improves the reliability and manufacturability of the sensor.

BRIEF DESCRIPTION IF THE DRAWINGS

For simplicity and clarity of illustration, elements in the drawings are not necessarily drawn to scale, and the same reference numerals in different figures denote the same elements.

DETAILED DESCRIPTION OF THE DRAWINGS

Figure 1:
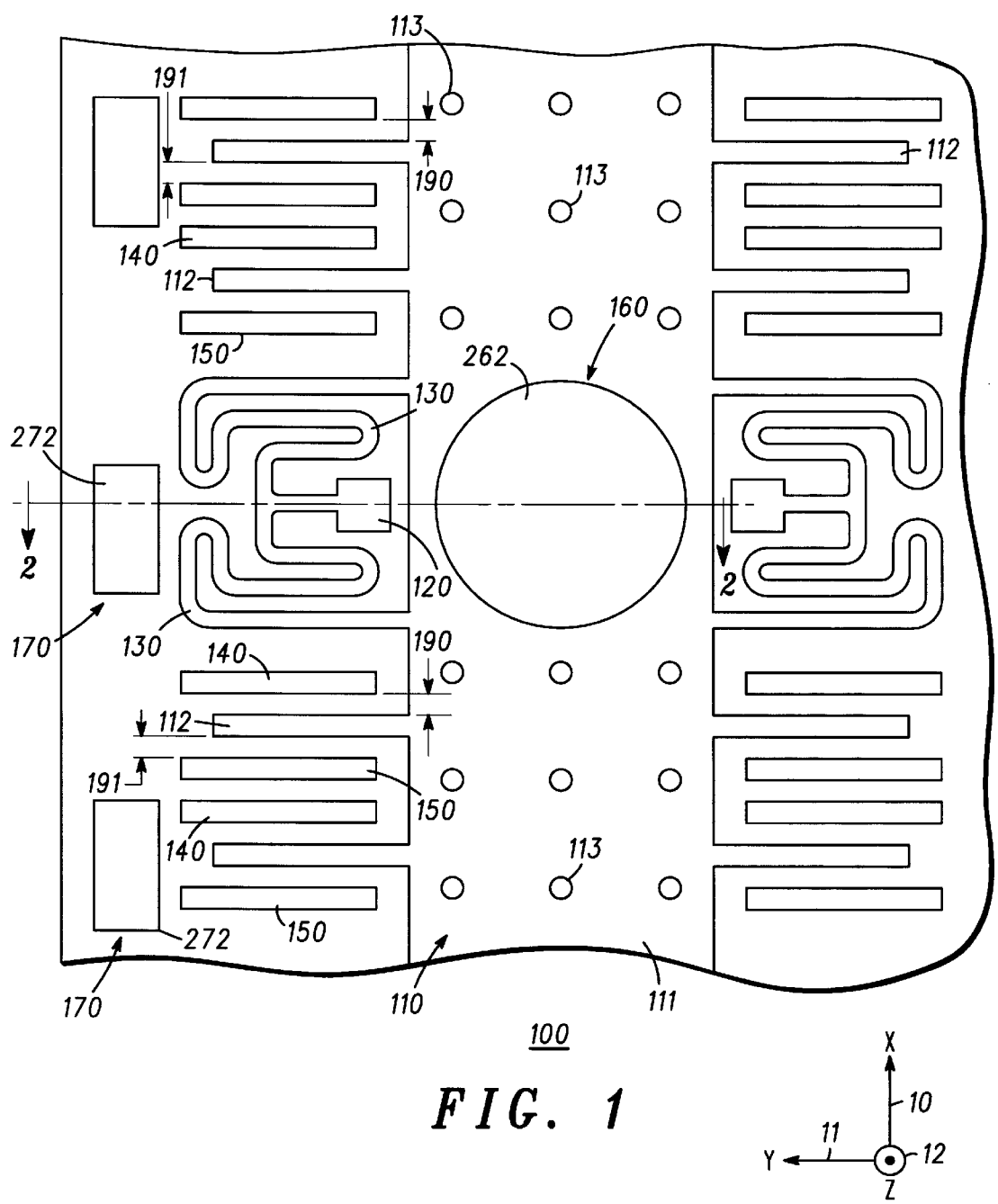
FIG. 1 illustrates a top view of an embodiment of a sensor in accordance with the present invention.

FIG. 1 illustrates a top view of a sensor 100. In the preferred embodiment of FIG. 1, sensor 100 is an accelerometer that senses or detects acceleration along an x-axis 10. X-axis 10 is substantially perpendicular or orthogonal to a y-axis 11 and a z-axis 12, and y-axis 11 is substantially perpendicular or orthogonal to z-axis 12. X, y, and z-axes 10, 11, and 12, respectively, define a right-handed Cartesian coordinate system. Therefore, z-axis 12 points out of the page in FIG. 1.

Sensor 100 includes, among other features, a movable electrode 110 and stationary electrodes 140 and 150. As illustrated in FIG. 1, stationary electrodes 140 are interdigitated between stationary electrodes 150. Stationary electrodes 140 are all electrically shorted together to be biased at the same potential, and stationary electrodes 150 are all electrically shorted together to be biased at a different potential. Electrodes 140 and 150 are not electrically shorted together.

Movable electrode 110 is coupled to, overlies, and is movable relative to an underlying support substrate. Movable electrode 110 has several components including a central body 111 and outer perimeter fingers 112 that are parallel to each other and that extend substantially perpendicularly away from the sides of central body 111. As illustrated in FIG. 1, each one of fingers 112 is located or interdigitated between a different pair of stationary electrodes 140 and 150.

Sensor 100 also includes anchors 120 and folded or bent suspension arms or beams 130. Anchors 120 overlie and are coupled to a surface of an underlying support substrate. Beams 130 couple or connect anchors 120 to body 111 of electrode 110. Anchors 120 and beams 130 suspend or support electrode 110 above the underlying support substrate. Anchors 120 and beams 130 permit electrode 110 to move independently of the support substrate. In particular, electrode 110 is movable along all of x, y, and z-axes 10, 11, and 12, respectively. X-axis 10 and y-axis 11 are both substantially parallel to a surface of the underlying substrate, and z-axis 12 is substantially perpendicular or orthogonal to the surface of the underlying substrate.

Sensor 100 also includes a stationary structure 160 that limits or restricts the motion or mobility of electrode 110 along x, y, and z-axes 10, 11, and 12. Structure 160 is explained in more detail hereinafter with respect to FIG. 2.

In FIG. 1, sensor 100 is also illustrated to further include electrodes or bonding pads 170 located outside of a perimeter of electrode 110. At least one of bonding pads 170 is electrically coupled to movable electrode 110; a different one of pads 170 is electrically coupled to stationary electrodes 140; and yet another one of pads 170 is electrically coupled to stationary electrodes 150.

In operation, stationary electrodes 140 and 150 can be electrically biased to two different potentials, and anchors 120, beams 130, body 111, and fingers 112 can be electrically biased to a third potential. For example, electrodes 140 can be biased to a first potential greater than the third potential while electrodes 150 are biased to a second potential less than the third potential, or vice versa.

A first capacitance is measured between one of fingers 112 and an immediately adjacent one of stationary electrodes 140, and a second capacitance is measured between that same one of fingers 112 and an immediately adjacent one of stationary electrodes 150. These two capacitances form a differential capacitor pair. Other differential capacitor pairs are formed in a similar manner using each of fingers 112. When sensor 100 is at rest and is not subject to any acceleration forces, the differential capacitances measured with fingers 112 is a steady-state or nominal differential capacitance, which can be zero.

An acceleration along x-axis 10 moves electrode 110 along x-axis 10. The acceleration moves all of electrode 110 such that fingers 112 move closer to one of their respective stationary electrodes 140 or 150. The rigidity of electrode 110 requires all of fingers 112 to simultaneously move in the same direction toward their respective electrode 140 or toward their respective electrode 150. In response to a larger acceleration force, fingers 112 move a greater distance to be closer to one of their respective stationary electrodes 140 or 150. This larger acceleration force produces a greater change in the differential capacitance from the nominal differential capacitance.

Figure 2:
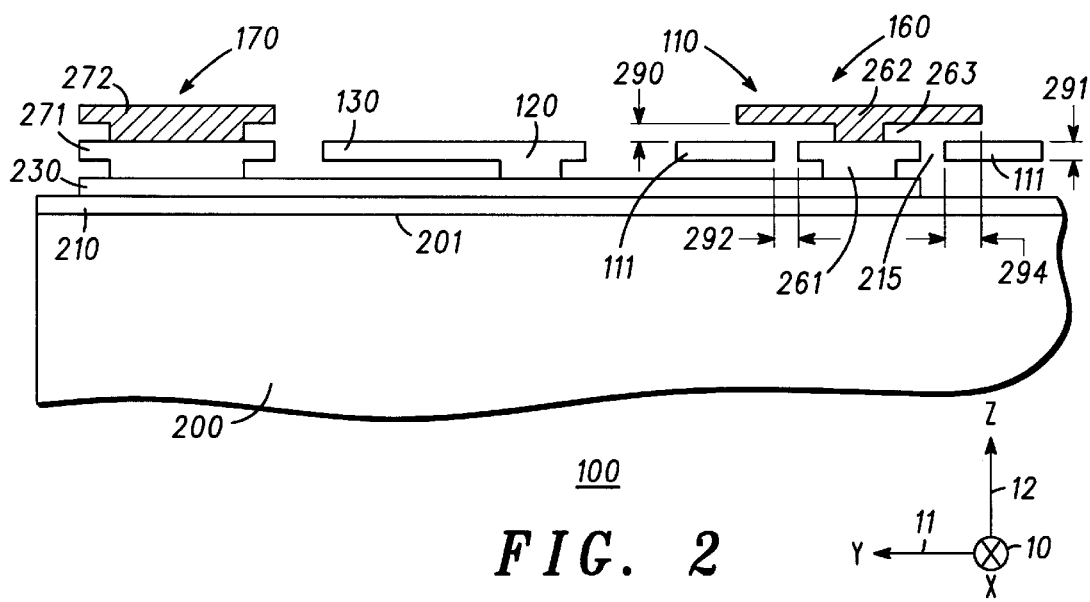
FIG. 2 illustrates a cross-sectional view of the sensor taken along a section line 2—2 in FIG. 1.

FIG. 2 illustrates a cross-sectional view of sensor 100 taken along a section line 2—2 in FIG. 1. Electrode 110, anchor 120, beam 130, and bonding pad 170 overlie a substantially planar surface 201 of a support substrate 200. X-axis 10 and y-axis 11 are substantially parallel to surface 201. Dielectric layer 210 is located between or separate substrate 200 from electrode 110, anchor 120, beam 130, and bonding pad 170 in order to electrically isolate substrate 200 from the overlying electrodes.

As illustrated in FIG. 2, electrode 110 has an opening or hole 215, and structure 160 is located within hole 215 and over electrode 110 to limit the mobility of electrode 110 along x, y, and z-axes 10, 11, and 12. Structure 160 35 overlies and is rigidly coupled to substrate 200 through hole 215 and is stationary with respect to substrate 200. Structure 160 has two main regions: a lower portion 261 and an upper portion 262. Lower portion 261 restricts the motion of electrode 110 along x-axis 10 and y-axis 11, and upper portion 262 restricts the motion of electrode 110 along z-axis 12 in the positive (+z) direction.

To optimize the performance of sensor 100, a distance 290 between overlying portion 262 of structure 160 and underlying body 111 of electrode 110 is preferably less than a thickness 291 of body 111. Distance 290 and thickness 291 are both measured in a direction along z-axis 12. In this configuration, body 111 will not fit within a recess 263 of structure 160 and will not become immobilized within recess 263.

To further optimize the performance of sensor 100, a distance 292 between lower portion 261 of structure 160 and body 111 of electrode 110 is preferably less than a distance 190 (FIG. 1) between finger 112 and electrode 140, and distance 292 is further preferably less than a distance 191 (FIG. 1) between finger 112 and electrode 150.

To still further optimize the performance of sensor 100, a distance 294 between the outer edge of structure 160 and the outer edge of hole 215 is preferably greater than distance 292.

Distances 190, 191, 292, and 294 are all measured in a direction substantially parallel to surface 201 of substrate 200. In this configuration, movable electrode 110 can impact or bump into structure 160 and will not bump into other stationary features such as beams 130 or electrodes 140 and 150.

Figure 3:
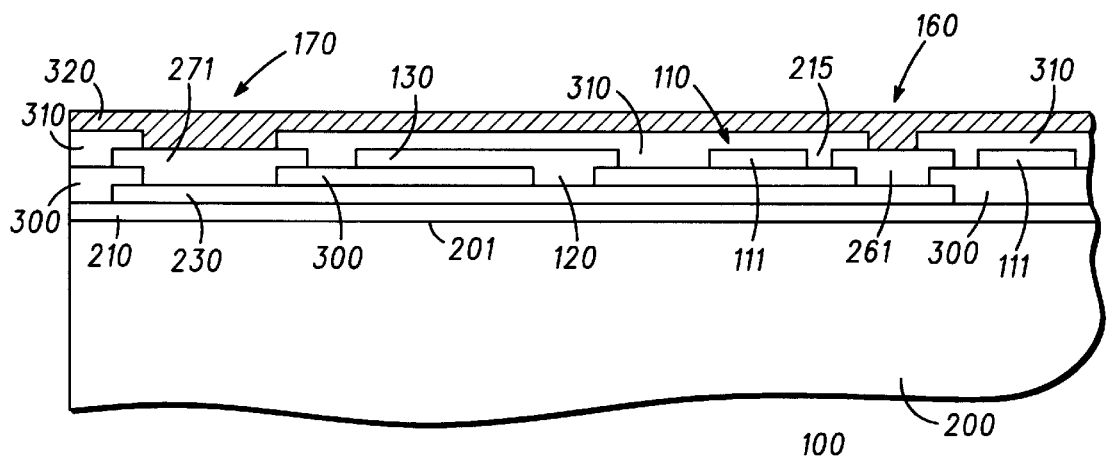
FIG. 3 illustrates a cross-sectional view of the sensor in FIG. 2 during an earlier stage of manufacturing.

FIG. 3 illustrates a cross-sectional view of sensor 100 during an earlier stage of manufacturing. The manufacturing process of sensor 100 does not require the use of any additional layers compared to prior art sensors. Thus, sensor 100 can be manufactured using conventional processes.

As explained earlier, sensor 100 includes a support substrate 200 that has a substantially planar surface 201. In the preferred embodiment, substrate 200 is comprised of a semiconductor such as, for example, single crystalline silicon. However, in an alternative embodiment, substrate 200 can also be comprised of glass or another rigid material having a flat surface.

Dielectric layer 210 is deposited or grown over surface 201 to provide electrical isolation between substrate 200 and the subsequently formed electrodes overlying substrate 200 and dielectric layer 210. As an example, layer 210 can be comprised of chemical vapor deposited silicon nitride.

Next, an electrically conductive layer is deposited over layer 210 and then patterned into layer 230. For ease of manufacturing, layer 230 is preferably comprised of polycrystalline silicon that is doped as-deposited or that is doped after being deposited. In a different embodiment, layer 230 can also be comprised of a metal or an intermetallic comprised of, for example, aluminum, copper, tungsten, titanium, gold, nickel, permalloy, or the like. In another embodiment, when substrate 200 is comprised of a semiconductor material, it is possible to use a junction-isolated conducting portion of substrate 200 instead of layer 230.

A first sacrificial layer is subsequently deposited over layers 230 and 210. This sacrificial layer is patterned into layer 300. As discussed hereinafter, layer 300 is later removed to release an overlying electrode in order to permit the electrode to move. Layer 300 is preferably removed without substantially affecting layer 210, and also without substantially affecting layer 230 and other subsequently formed electrically conductive features of sensor 100. As an example, layer 300 can be comprised of a chemical vapor deposited doped silicon dioxide such as phosphosilicate glass.

Then, another electrically conductive layer is deposited over layers 230 and 300 and patterned into a plurality of electrically conductive features of sensor 100. In particular, this electrically conductive layer is used to simultaneously form a lower portion 271 of bonding pad 170, beam 130, anchor 120, body 111 of electrode 110, and portion 261 of structure 160. Although not illustrated in FIG. 3, this electrically conductive layer is also used to simultaneously form fingers 112 (FIG. 1) of electrode 110, and stationary electrodes 140 and 150 (FIG. 1). Depositing the electrically conductive layer defines thickness 291 discussed earlier with respect to FIG. 2. In the preferred embodiment, thickness 291 is between approximately one to twenty micrometers.

Patterning or etching the electrically conductive layer defines a hole 215 in electrode 110 and also defines through-holes 113 (FIG. 1) in body 111 of electrode 110, distance 292 in FIG. 2, and distances 190 and 191 in FIG. 1. As illustrated in FIG. 2, portion 261 of structure 160 is located within hole 215 of body 111 to provide the motion restricting or over-travel limiting function described earlier. In the preferred embodiment, this electrically conductive layer is comprised of a material similar to that used for layer 230 to facilitate the subsequent selective removal of the sacrificial layers.

A second sacrificial layer is subsequently deposited over layer 300, portion 271 of bonding pad 170, beam 130, anchor 120, electrode 110, and portion 261 of structure 160. This second sacrificial layer is patterned into layer 310. As discussed hereinafter, layer 310 is later removed to release underlying electrode 110 and beam 130. Similar to layer 300, layer 310 is preferably removed without substantially affecting layers 210 and 230, bonding pad 170, beam 130, anchor 120, electrode 110, and structure 160. In the preferred embodiment, layer 310 is comprised of a material similar to that used for layer 300. For example, layer 310 can be comprised of phosphosilicate glass.

The top surface of layer 310 is preferably substantially planar to ensure proper formation of an electrically conductive layer that is deposited onto layer 310. To ensure a substantially planar top surface for layer 310 and to substantially eliminate voids within layer 310, the following multi-step process is preferably used. A first portion of layer 310 is initially deposited over layer 300, portion 271 of bonding pad 170, anchor 120, beam 130, electrode 110, and portion 261 of structure 160. The first portion has a thickness that is greater than half of the total thickness of layer 310. Then, the first portion is sputter etched to about half of the thickness of layer 310. The sputter etch step is a blanket etch that etches the entire top surface of the first portion and does not use an etch mask. Next, the remaining first portion is annealed to permit the sacrificial layer to flow and pinch off any voids. This etch and anneal combination provides a smoother surface for the subsequent deposition of a second portion of layer 310. This second portion of layer 310 is deposited to have a thickness greater than half of the total thickness of layer 310. The entire top surface of the second portion is also sputter etched to reduce the thickness of the second portion to about half of the thickness of layer 310. Then, the sacrificial layer is patterned to form layer 310.

Next, another electrically conductive layer 320 is deposited over layer 310 and subsequently patterned. Layer 320 is used to simultaneously form an upper portion 272 (FIG. 2) of bonding pad 170 and portion 262 (FIG. 2) of structure 160. Portion 272 of bonding pad 170 is located over and is coupled to portion 271 of bonding pad 170. Portion 262 (FIG. 2) of structure 160 is located over hole 215 and is located over and is coupled to portion 261 of structure 160. Portion 262 overlaps or overlies a portion of body 111 of electrode 110 to provide the motion restricting or over-travel limiting function in the positive z direction as described earlier.

Layer 320 is comprised of a different material than that used to form portion 271 of bonding pad 170, beam 130, anchor 120, electrode 110, and portion 261 of structure 160. Because layer 320 is used to form portion 272 (FIG. 2) of bonding pad 170, layer 320 is preferably compatible with a subsequent wire bonding process such that a wire bond can be attached directly to portion 272. In the preferred embodiment, layer 320 is comprised of a metal such as, for example, aluminum. Layer 320 can be doped with silicon to prevent aluminum spiking into the underlying polycrystalline silicon layer. Layer 320 also needs to be sufficiently thick so that portion 262 (FIG. 2) of structure 160 is strong enough to restrict the mobility of electrode 110 along z-axis 12. As an example, layer 320 can be approximately one to five micrometers thick.

Then, layers 310 and 300 are selectively removed to release electrode 110 and beam 130 after completing the formation of structure 160 and bonding pad 170. As an example, layers 310 and 300 can be removed by using a wet etchant comprising hydrofluoric acid and acetic acid that selectively etches layers 310 and 300 so that the permanent features of sensor 100 are not substantially etched. Holes 113 (FIG. 1) in body 111 facilitate the flow of the wet etchant to remove layers 310 and 300.

As illustrated in FIG. 3, bonding pad 170, anchor 120, and structure 160 can be electrically shorted together by layer 230. Therefore, electrode 110 is also electrically shorted to structure 160 because, as illustrated in FIG. 1, anchor 120 and electrode 110 are electrically shorted together. During assembly and packaging of sensor 100, a wire bond can be attached to bonding pad 170 to provide the same electrical potential to electrode 110 and structure 160. This identical electrical potential between electrode 110 and structure 160 reduces the possibility of latching or stiction between electrode 110 and structure 160 during operation of sensor 100. Therefore, this electrical configuration of sensor 100 improves the reliability of sensor 100.

Figure 4:
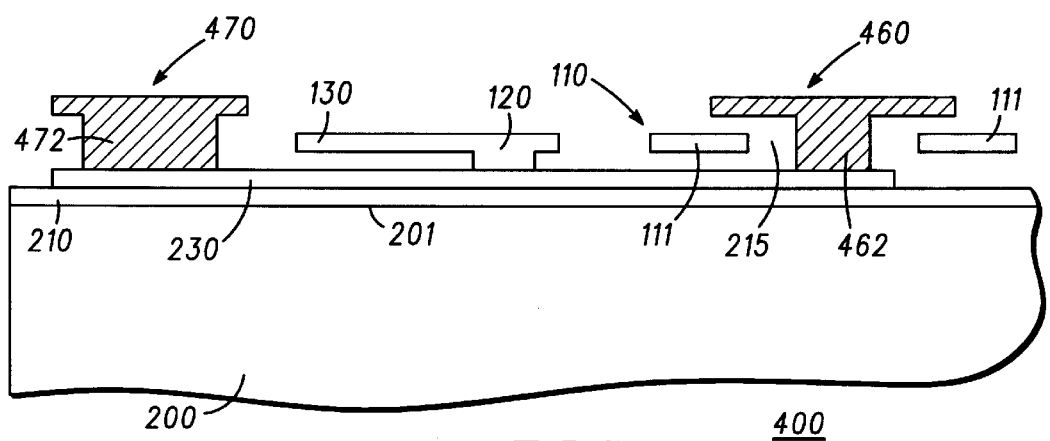
FIG. 4 illustrates a cross-sectional view of a different embodiment of the sensor in FIG. 2.

FIG. 4 illustrates a cross-sectional view of a sensor 400, which is a different embodiment of sensor 100 in FIG. 2. A bonding pad 470 and a structure 460 of sensor 400 are similar to bonding pad 170 and structure 160, respectively, of sensor 100 in FIG. 2. Bonding pad 470 has a portion 472 and structure 460 has a portion 462 that are similar in composition to portion 272 of pad 170 and portion 262 of structure 160, respectively, in FIG. 2. However, unlike pad 170 or structure 160, the lower portions of bonding pad 470 and structure 460 are not formed simultaneously with beam 130, anchor 120, and electrode 110. Instead, portion 472 of pad 470 and portion 462 of structure 460 are formed to be directly coupled to layer 230. Therefore, portion 462 of structure 460 partially overlies body 111 of electrode 110 and also extends through hole 215 of body 111. In an alternative embodiment, sensor 400 may substitute either bonding pad 170 (FIG. 2) for pad 470 or structure 160 (FIG. 2) for structure 460.

Figure 5:
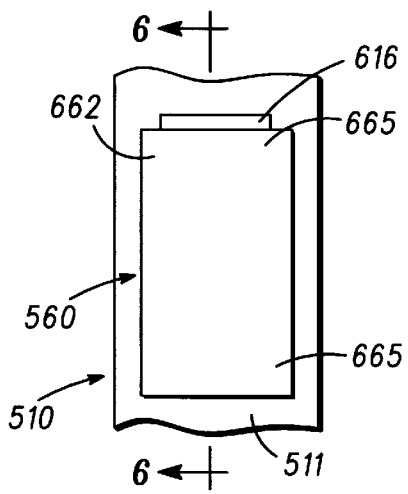
FIG. 5 illustrates a simplified partial top view of another embodiment of the sensor in FIG. 1.
Figure 6:
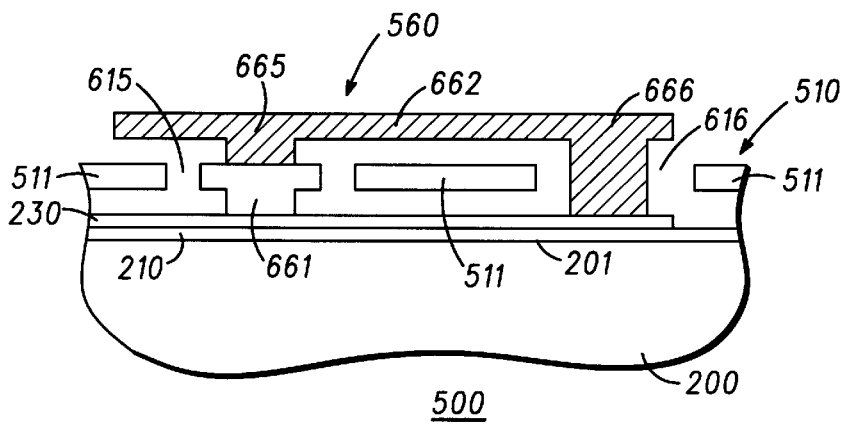
FIG. 6 illustrates a cross-sectional view of the sensor in FIG. 5 taken along a section line 6—6 in FIG. 5.

FIG. 5 illustrates a simplified partial top view of sensor 500, which is another embodiment of sensor 100 in FIG. 1, and FIG. 6 illustrates a cross-sectional view of sensor 500 taken along a section line 6—6 in FIG. 5. Sensor 500 has an electrode 510 with a central body 511 that are similar to electrode 110 and body 111, respectively, of sensor 100 in FIG. 1. Sensor 500 also has a structure 560 that is similar to structure 160 of sensor 100 in FIG. 1. Structure 560 has a portion 662 that is similar in composition to portion 262 of structure 160 in FIG. 2. Portion 662 of structure 560 has adjacent or contiguous and substantially coplanar portions 665 and 666. In this embodiment, structure 560 has the shape of a staple or bridge. Body 511 has two openings or holes 615 and 616 through which portions 665 and 666 of structure 560 respectively extend.

Portion 665 of structure is illustrated to include a lower portion 661 that is formed simultaneously with electrode 510, but portion 666 is illustrated to be directly coupled to layer 230. A perimeter of portion 665 is also illustrated to overlap body 511 of electrode 510 while a perimeter of portion 666 is not illustrated to overlap body 511. In the preferred embodiment of sensor 500, portions 665 and 666 are identical to each other. The different illustrations of portions 665 and 666 are merely examples of potential configurations.

Figure 7:
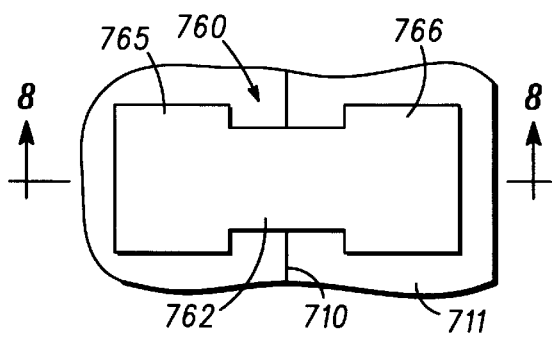
FIG. 7 illustrates a simplified partial top view of yet another embodiment of the sensor in FIG. 1.
Figure 8:
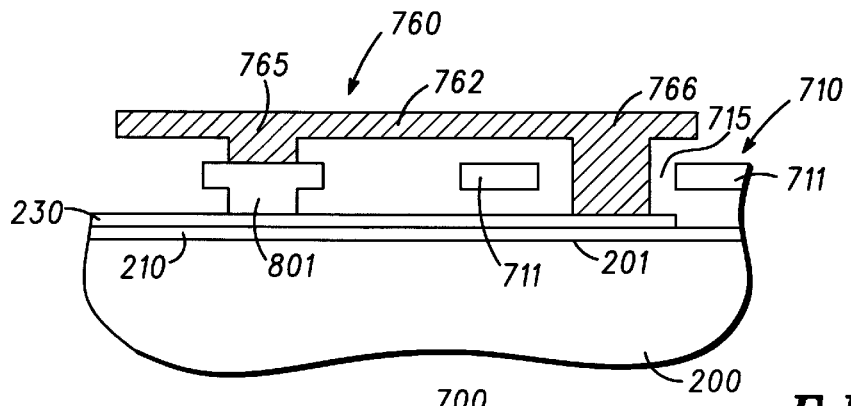
FIG. 8 illustrates a cross-sectional view of the sensor in FIG. 7 taken along a section line 8—8 in FIG. 7.

FIG. 7 illustrates a simplified partial top view of sensor 700, which is yet another embodiment of sensor 100 in FIG. 1, and FIG. 8 illustrates a cross-sectional view of sensor 700 taken along a section line 8—8 in FIG. 7. Sensor 700 has an electrode 710 with a central body 711 that are similar to electrode 110 and body 111, respectively, of sensor 100 in FIG. 1. Sensor 700 also has a structure 760 that is similar to structure 160 of sensor 100 in FIG. 1. Structure 760 has a portion 762 that is similar in composition to portion 262 of structure 160 in FIG. 2. Portion 762 of structure 760 has adjacent or contiguous and substantially coplanar portions 765 and 766. A perimeter of portion 766 is illustrated to overlap body 711 of electrode 710, but portion 766 may alternatively not overlap body 711.

Similar to structure 560 in FIG. 6, structure 760 in FIG. 8 has the shape of a staple or bridge. However, the orientation of structures 560 and 760 is different with respect to their accompanying movable electrode. In FIG. 8, body 711 has an opening or hole 715 through which portion 766 of structure 760 extends. Portion 765 of structure 760 does not extend through electrode 710, but extends beyond or is located at a position outside of a perimeter of electrode 710. Portion 765 of structure 760 is illustrated to include a lower portion 801 that is formed simultaneously with electrode 710, but portion 766 is illustrated to be directly coupled to layer 230. In the preferred embodiment of sensor 700, portions 765 and 766 are coupled to layer 230 in an identical manner. The different illustrations of portions 765 and 766 are merely examples of potential configurations. In an alternative embodiment of sensor 700, electrode 710 does not have hole 715, and portion 766 of structure 760 does not extend through electrode 710. Instead, portion 766 is coupled to substrate 200 at a position outside of the perimeter of electrode 710. In this embodiment, portions 765 and 766 can be located at opposite sides of electrode 710.

Therefore, an improved sensor and method of manufacture is provided to overcome the disadvantages of the prior art. The sensors described herein have improved reliability because of their three dimensional overtravel limiters. With the use of overtravel limiters, the sensors are also able to withstand high impact forces in a direction along the sensor's axis of sensitivity and in other directions not along the sensor's axis of sensitivity. By forming the over-travel limiter out of the same material used to provide good adhesion of a wire bond or bump material to the bonding pads of the sensor, the need for an additional layer that is used exclusively for the over-travel limiter is eliminated. This elimination of the need for an extra layer reduces the cost and complexity of the manufacturing process.

The over-travel prevention can also be accomplished by using a sufficiently thick polysilicon layer to form beam 130 and electrode 110 in FIG. 2. However, the deposition of the thick polysilicon is extremely expensive and time consuming, and the patterning of the thick polysilicon layer is also time consuming and is more difficult to control.

While the invention has been particularly shown and described mainly with reference to preferred embodiments, it will be understood by those skilled in the art that changes in form and detail may be made without departing from the spirit and scope of the invention. For instance, the numerous details set forth herein such as, for example, material compositions and specific circular, rectangular, or dog-bone configurations are provided to facilitate the understanding of the present invention and are not provided to limit the scope of the invention. As another example, the concept of structures 160 (FIG. 1), 460 (FIG. 4), 560 (FIG. 6), and 760 (FIG. 8) can be applied to both in-plane and out-of-plane accelerometers. Furthermore, holes 215 (FIGS. 2, 4, and 8), 615 (FIG. 6), 616 (FIG. 6), and 715 (FIG. 8) do not have to be completely defined by the body of the movable electrode, but can be only partly defined by the body such that the hole resembles a notch cut into a side of the body. As yet another example, if sensor 100 in FIG. 2 were combined with an integrated circuit on substrate 200, then portion 262 of structure 160 could be formed simultaneously during a silicide process to form electrodes or electrical contacts for a transistor, such as source and drain contacts for a field-effect transistor. Moreover, the over-travel limiting structures disclosed herein can be enlarged to cover electrodes 110, 140, and 150 and beams 130 to provide protection from particulates that could interfere with the operation of the sensor. Accordingly, the disclosure of the present invention is not intended to be limiting. Instead, the disclosure of the present invention is intended to be illustrative of the scope of the invention, which is set forth in the following claims.

What is claimed is:

1. A method of manufacturing a sensor comprising:
    (a) providing a support substrate with a surface;
    (b) forming an electrode from a first material, the electrode being coupled to, overlying, and movable relative to the surface of the support substrate; and
    (c) forming from a second material that is different from the first material at least a portion of a structure overlying a portion of the electrode and overlying the surface of the support substrate wherein the structure limits mobility of the electrode along three mutually orthogonal axes, wherein a first axis of the three mutually orthogonal axes is substantially parallel to the surface wherein the sensor detects acceleration along the first axis.

2. The method of claim 1 wherein step (c) further comprises using the second material to form at least a portion of a bonding pad.

3. The method of claim 1 wherein step (c) further comprises simultaneously using the second material to form at least a portion of a different electrode.

4. The method of claim 1 wherein step (b) further comprises providing doped polycrystalline silicon for the first material.

5. The method of claim 1 wherein step (c) further comprises selecting the second material from the group consisting of a metal and an intermetallic compound.

6. The method of claim 1 further comprising electrically shorting together the electrode and the structure.

7. The method of claim 1 wherein step (b) further comprises providing the electrode with a thickness, and
    wherein step (c) further comprises:
        overlapping a portion of the electrode with a portion of the structure; and
        providing a distance between the portion of the electrode and the portion of the structure wherein the distance is smaller than the thickness of the electrode and wherein the distance is measured in a direction substantially perpendicular to the surface of the support substrate.

8. The method of claim 1 wherein step (b) further comprises:
    forming a hole through the electrode; and
    forming a first portion of the structure in the hole, and
    wherein step (c) further comprises positioning a second portion of the structure over and coupled to the first portion of the structure, over the hole, and over a portion of the electrode.

9. The method of claim 8 wherein step (c) further comprises forming a third portion of the structure contiguous and substantially coplanar with the second portion of the structure and extending beyond a perimeter of the electrode.

10. The method of claim 8 wherein step (c) further comprises forming a third portion of the structure contiguous and substantially coplanar with the second portion of the structure and extending beyond a perimeter of the electrode wherein the third portion of the structure is coupled to the surface of the support substrate at a location beyond the perimeter of the electrode.

11. The method of claim 8 wherein step (b) further comprises forming an other hole through the electrode, and
    wherein step (c) further comprises positioning the second portion of the structure overlying the other hole and coupled to the surface of the support substrate through the other hole.

12. The method of claim 1 wherein step (b) further comprises forming a hole through the electrode, and
    wherein step (c) further comprises:
        forming a first portion of the structure in the hole; and
        forming a second portion of the structure coupled to the first portion, overlying the hole, and overlying a portion of the electrode.

13. The method of claim 12 wherein step (c) further comprises forming a third portion of the structure extending beyond a perimeter of the electrode.

14. The method of claim 12 wherein step (c) further comprises forming a third portion of the structure extending beyond a perimeter of the electrode wherein the third portion is coupled to the surface of the support substrate at a location outside of the perimeter of the electrode.

15. The method of claim 12 wherein step (b) further comprises forming an other hole through the electrode, and wherein step (c) further comprises positioning the second portion of the structure overlying the other hole and coupled to the surface of the support substrate through the other hole.

16. The method of claim 1 wherein step (c) further comprises:
   coupling the portion of the structure to the support substrate at a location beyond a perimeter of the electrode; and
   providing a different portion of the structure contiguous with the portion of the structure wherein the different portion of the structure overlies at least a portion of the electrode.

17. A method of manufacturing a sensor comprising:
   selecting a substrate from the group consisting of a semiconductor material and glass, the substrate having a surface;
   depositing a first sacrificial layer over the surface, the first sacrificial layer comprised of phosphosilicate glass;
   patterning the first sacrificial layer;
   forming an electrode over the first sacrificial layer, the electrode comprised of doped polycrystalline silicon;
   depositing a second sacrificial layer over the electrode, the second sacrificial layer comprised of phosphosilicate glass;
   patterning the second sacrificial layer;
   simultaneously forming bonding pads around a perimeter of the electrode and at least a portion of a structure over a portion of the electrode, the bonding pads and the portion of the structure comprised of aluminum and silicon; and
   selectively removing the first and second sacrificial layers to release the electrode after simultaneously forming the bonding pads and the portion of the structure wherein the electrode is movable along first, second, and third axes substantially perpendicular to each other after the selectively removing step, wherein the electrode is movable relative to the substrate, wherein the bonding pads and the structure are stationary relative to the substrate after the selectively removing step, wherein the sensor detects acceleration along the first axis, wherein the first and second axes are substantially parallel to the surface of the substrate, wherein the third axis is substantially perpendicular to the surface of the substrate, and wherein the structure is rigidly coupled to the substrate and restricts mobility of the electrode along the first, second, and third axes.

* * * * *